US006547334B1

(12) United States Patent
Girardin

(10) Patent No.: US 6,547,334 B1
(45) Date of Patent: Apr. 15, 2003

(54) CHILD SEAT BELT ASSEMBLY

(76) Inventor: Jean-Marc Girardin, 4000 NE. 168th St., #105, North Miami Beach, FL (US) 33160

(*) Notice: Subject to any disclaimer, the term of this patent is extended or adjusted under 35 U.S.C. 154(b) by 0 days.

(21) Appl. No.: 09/985,572

(22) Filed: Nov. 5, 2001

(51) Int. Cl.$^7$ ............................................... B60R 22/10
(52) U.S. Cl. ........................ 297/484; 297/467; 297/485
(58) Field of Search ................................. 297/467, 484, 297/485, 468

(56) References Cited

U.S. PATENT DOCUMENTS

| | | | |
|---|---|---|---|
| 3,325,213 A | 6/1967 | Levy | |
| 3,791,694 A | 2/1974 | Roberts | |
| 3,938,859 A | 2/1976 | Henderson | |
| 4,033,622 A | 7/1977 | Boudreau | |
| 4,376,551 A | 3/1983 | Cone | |
| 4,411,473 A | 10/1983 | Eltridge | |
| 4,540,218 A | 9/1985 | Thomas | |
| 4,874,203 A | 10/1989 | Henley | |
| 4,885,200 A | 12/1989 | Perdelwitz | |
| 4,927,211 A * | 5/1990 | Bolcerek | 297/467 |
| 4,943,112 A * | 7/1990 | Law | 297/467 |
| 5,056,869 A | 10/1991 | Morrison | |
| 5,074,588 A | 12/1991 | Huspen | |
| 5,580,126 A | 12/1996 | Sedlack | |
| 5,713,630 A | 2/1998 | Kvalvik | |
| 5,730,498 A * | 3/1998 | Hanson et al. | 297/484 |
| 5,839,965 A * | 11/1998 | Mullins | 297/485 |
| 5,868,465 A | 2/1999 | Kvalvik | |
| 5,971,492 A | 10/1999 | Pitman | |
| 6,095,613 A | 8/2000 | Osrander | |
| 6,109,698 A * | 8/2000 | Perez | 297/484 |
| 6,186,521 B1 | 2/2001 | Divoky | |
| 6,364,417 B1 * | 4/2002 | Silverman | 297/485 |

* cited by examiner

Primary Examiner—Peter R. Brown
(74) Attorney, Agent, or Firm—Dowell & Dowell, P.C.

(57) ABSTRACT

A vehicle safety restraint system, for use by a child, that can be installed and removed from any vehicle seat. The single end of a first Y-shaped belt is passed over the back of the seat and the double end, which hangs over the front of the seat, is provided with a pair of closed loops. A lap belt passes through the loops and the free ends thereof are releasably secured to respective ones of the double end of a second Y-shaped belt, placed on the seat. The single end of the second belt passes between the seat and the seat back and is releasably secured to the single end of the first Y-shaped belt. Optionally, a crotch strap is also releasably secured to the second Y-shaped belt, passed upwardly between the legs of the child and the other end releasably secured to the first Y-shaped belt adjacent the closed loops.

6 Claims, 5 Drawing Sheets

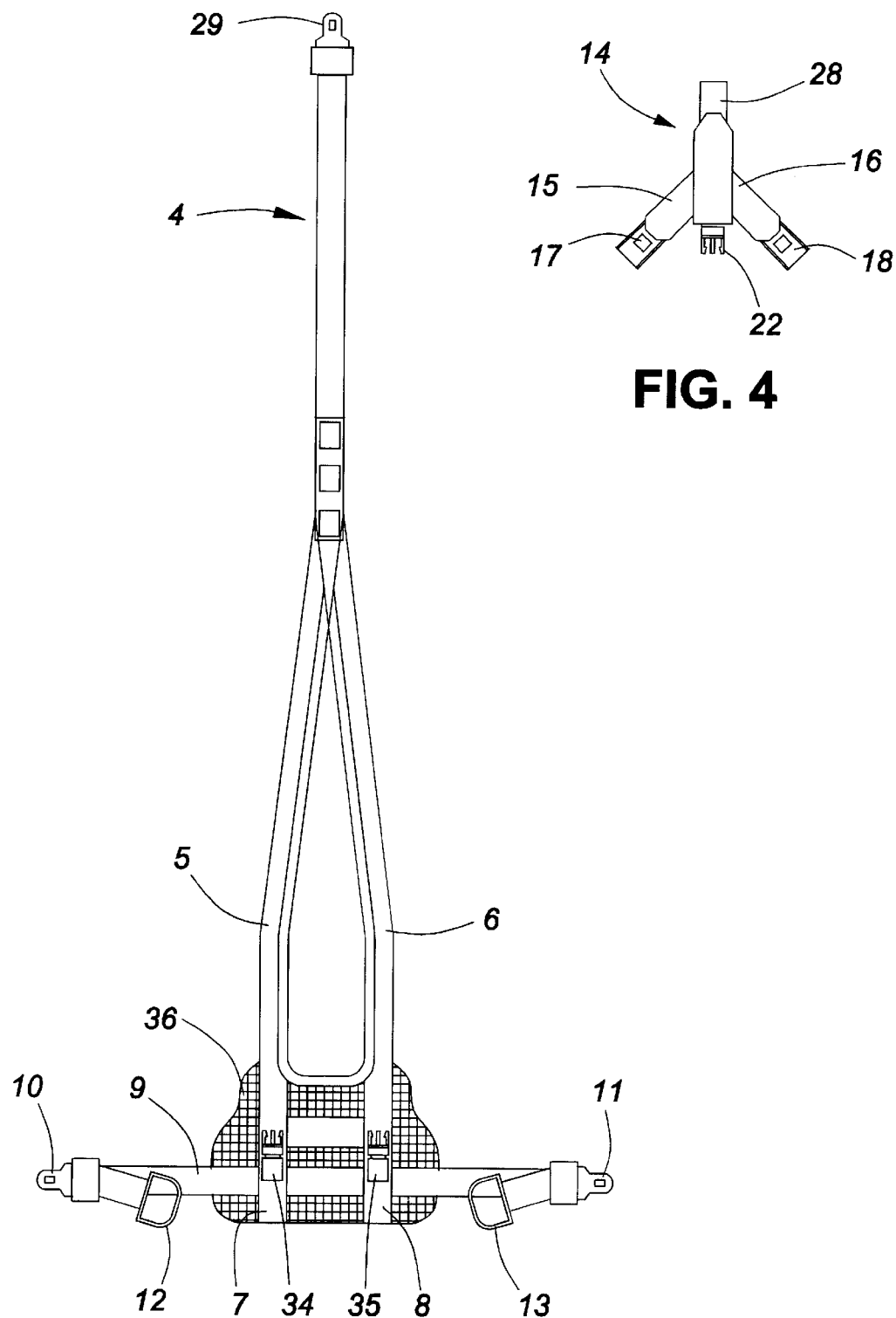

CHILD SEAT BELT ASSEMBLY

FIELD OF INVENTION

This invention relates to a vehicle safety restraint system and more particularly to a child seat belt system for use in an automobile.

BACKGROUND OF INVENTION

Young children are generally restrained in an automobile, by government decree, in specially designed forwardly or rearwardly facing seats that are, in turn, secured to the regular vehicle seat using manufacturer installed seat belts. Children who have outgrown the conventional forward facing booster seat are, however, often too small to use the regular, adult sized, seat belt system safely and there is, therefore a need for a specially designed seat belt system for such intermediately sized children to use while sitting on the regular vehicle seat.

OBJECT OF INVENTION

It is an object of the present invention to provide a vehicle seat belt assembly for use by children that can be readily installed on, and removed from, a vehicle seat and that is independent of the conventional, manufacturer installed seat belt system.

BRIEF STATEMENT OF INVENTION

By one aspect of this invention there is provided a child safety restraint system for use in a vehicle provided with a seat having a back portion and a seat portion, comprising: a first Y-shaped elongated flexible belt member having a single first end and a bifurcated second end; said first end being provided with a first portion of a releasable snap fastening, and each part of said second end terminating in a closed loop; said first end of said first Y-shaped belt being adapted to pass over said back portion of said seat and depend downwardly therefrom;

- a second Y-shaped flexible belt member having a single first end and a bifurcated second end; said first end being adapted to pass between said back portion and said seat portion of said seat and provided with a complementary second portion of said snap fastening adapted to releasably engage with said first portion on said first Y-shaped belt; said bifurcated end terminating in a pair of first portions of a releasable snap fastening; and
- a flexible elongated lap belt member adapted to pass through said closed loops in said first Y-shaped belt and provided with complementary second portions of a releasable snap fastening at each end thereof adapted to releasably engage with respective ones of said pair of first portions of snap fastenings on said second Y-shaped belt member.

BRIEF DESCRIPTION OF DRAWINGS

FIG. 1 is a front view of one embodiment of the present invention showing an

FIG. 3 is a front view of a second embodiment of a first part of a seat belt assembly of the present invention, attachable to a vehicle seat;

FIG. 4 is a front view of a seat Y-belt assembly for attachment to the belt of FIG. 3;

DETAILED DESCRIPTION OF PREFERRED EMBODIMENTS

Figure 1:
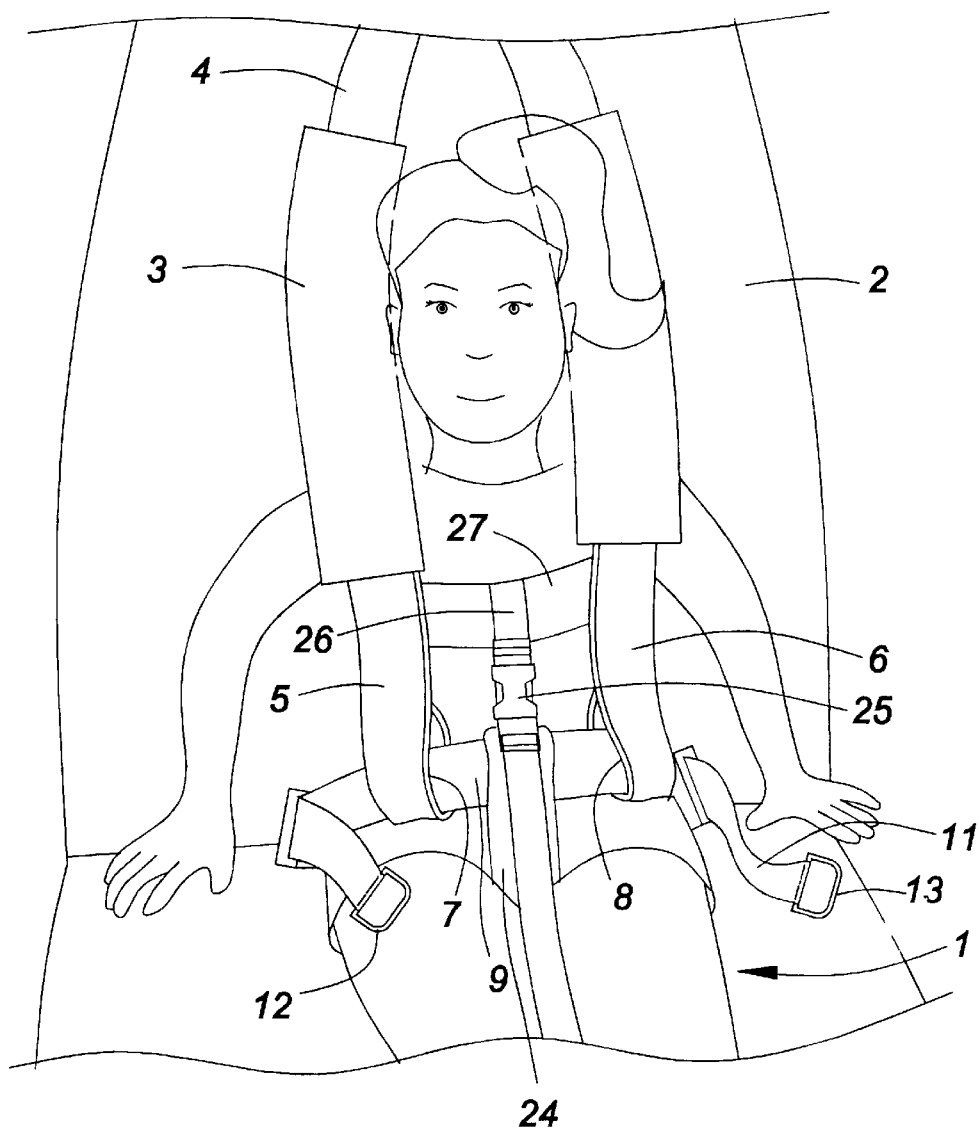
Figure 2:
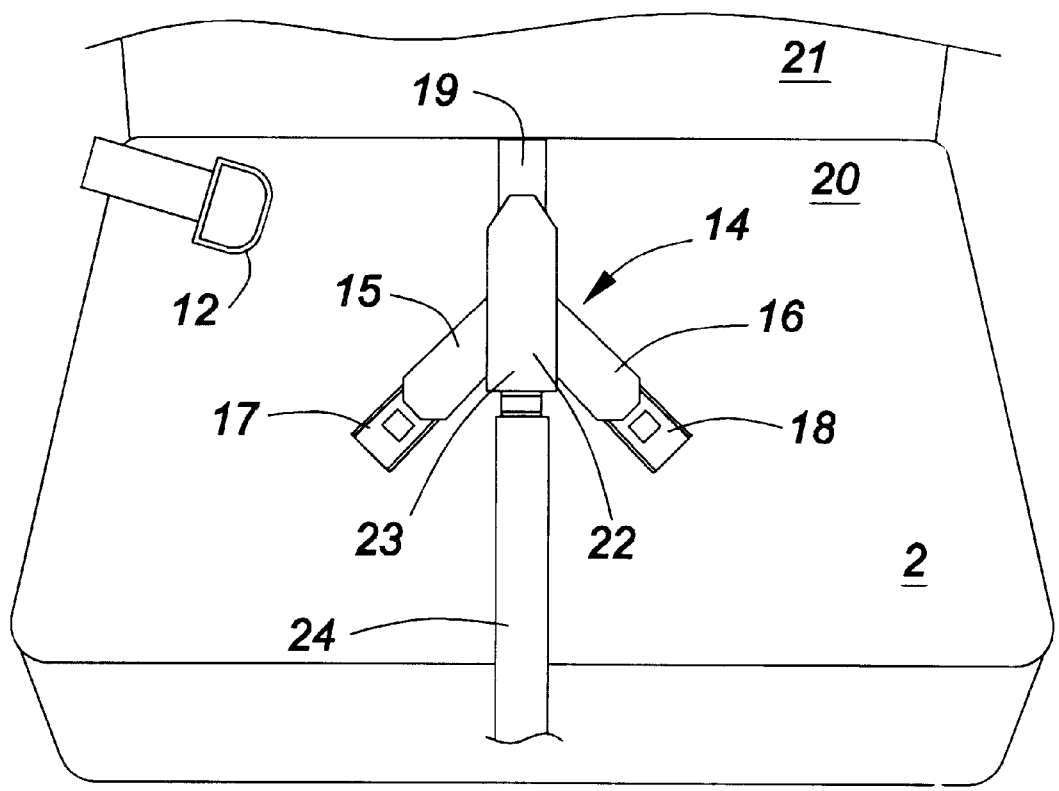
FIG. 2 is a front view of the embodiment of FIG. 1, unoccupied.

In FIG. 1 there is shown a child 1 sitting on a vehicle seat 2 and secured thereto by a seat belt assembly 3. A Y-shaped, elongated, flexible shoulder belt 4, generally fabricated from nylon webbing or leather, passes over the back of seat 2 and terminates in one end of a releasable snap fastening 29 (FIG. 3), generally but not essentially a male fitting, which depends downwardly at the back of the seat back. The bifurcated end (5,6) of the strap 4 terminates in loops 7,8, which depend downwardly in front of the seat back 21, respectively. A lap belt 9 passes through loops 7,8 and terminates in releasable snap fastenings 10, 11 slidably mounted adjacent each respective end thereof. Generally, but not essentially, fittings 10, 11 are male fittings. Length adjusting rings 12, 13 are also provided at the ends of belt 9. As seen in FIG. 2, a Y-shaped flexible webbing belt 14 is placed on seat 2, and is provided with arms 15, 16 which terminate in complementary snap fittings 17, 18 adapted to receive fittings 10, 11 respectively. As seen in FIG. 2, fittings 17, 18 are female fittings. Belt 14 is also provided with an elongated arm 19, which passes between the seat squab 20 and seat back 21, and terminates in a complementary snap fastening, generally female, 28 (FIG. 4) adapted to receive snap fitting 29 (FIG. 3) at the rear end of shoulder belt 4. Optionally, Y-shaped belt 14 is also provided with a snap fitting 22, generally a male fitting, adapted to be received by a female snap fitting 23 at one end of a padded flexible webbing crotch strap 24. Padded strap 24 passes upwardly between the legs of the child and is provided with an adjustable snap fitting 25, generally female, at the other end thereof, adapted to receive a complementary, generally male, fitting 26 securely mounted on a flexible cross strap 27 which in turn is securely fastened to belt 4 adjacent loops 5,6 thereof, as seen in FIG. 1.

Figures 5, 6:
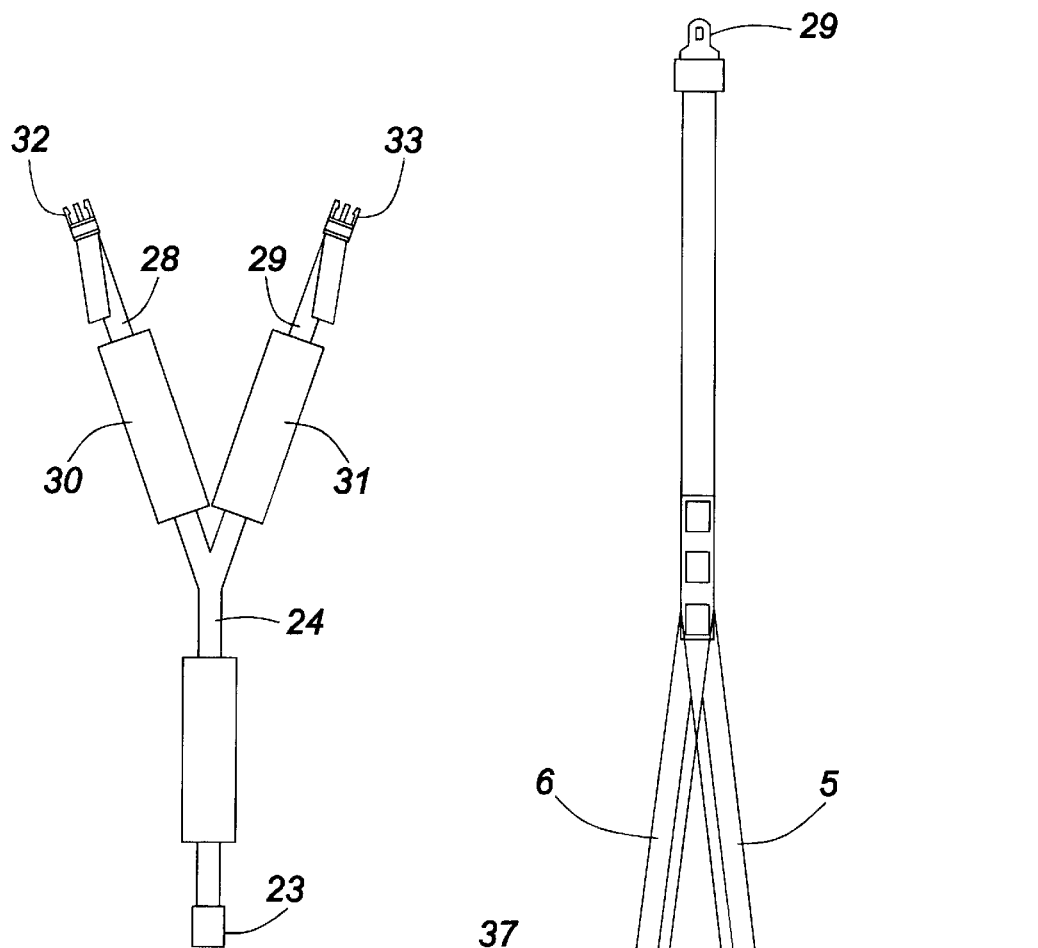
FIG. 5 is a front view of a crotch strap assembly for attachment intermediate the belts of FIGS. 3 and 4.
FIG. 6 is a rear view of an alternate embodiment of the seat belt assembly of FIG. 3.
Figure 7:
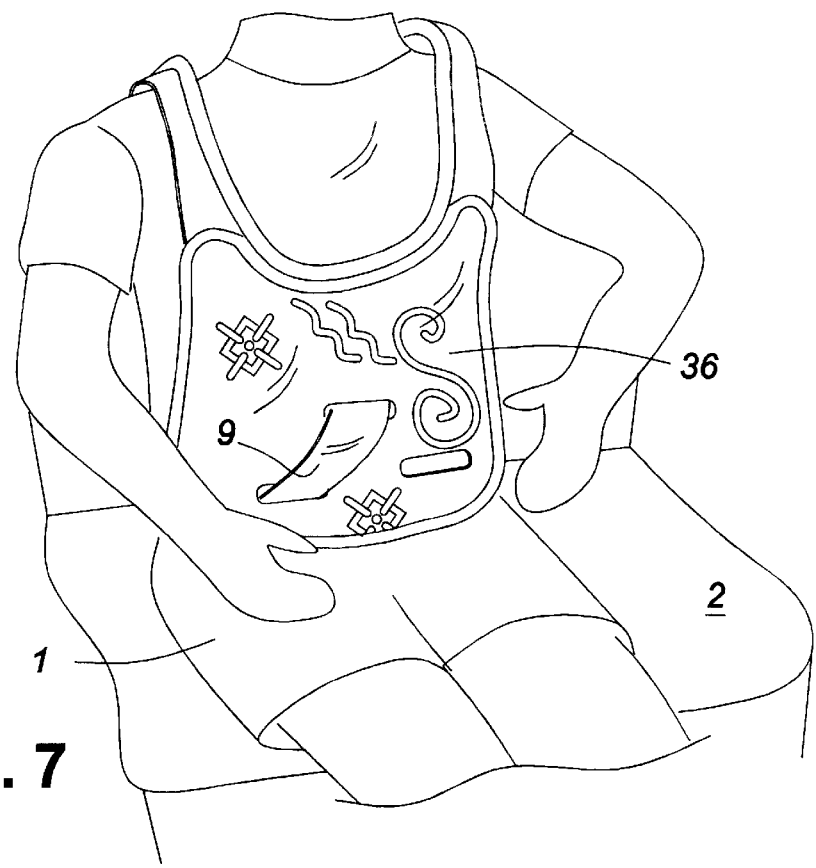
FIG. 7 is a front view of an alternate embodiment of the assembly shown in FIG. 1.
Figure 8:
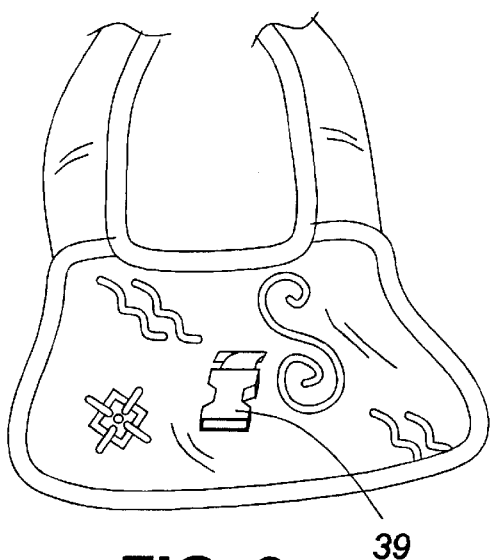
FIG. 8 is a front view of the bib portion of the embodiment of FIG. 7.
Figure 9:
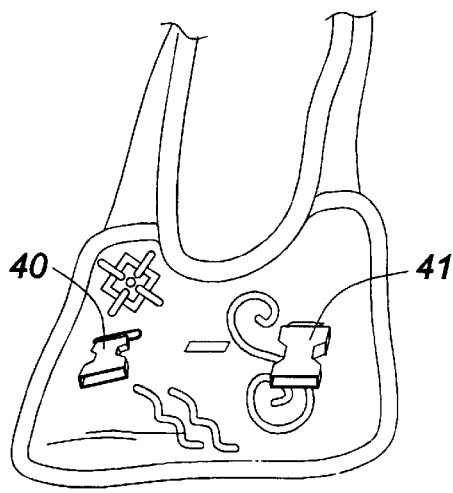
FIG. 9 is a rear view of the bib portion of the embodiment of FIG. 7.

The embodiment shown in FIGS. 3, 4 and 5 is essentially similar to the embodiment of FIGS. 1 and 2 and similar parts have been assigned the same reference numerals. There are, however, significant differences in that the optional padded flexible belt 24 is Y-shaped and the arms 28, 29 thereof are provided with padded areas 30, 31 so as to protect the legs of the child 1 against chafing. The arms 28, 29 terminate in releasable snap fastenings, generally male, adapted to be received by complementary, generally female, fastenings 34, 35 that are securely mounted on arms 5,6 of shoulder belt 4. In an optional variation, shoulder belt 4 may be provided with padded areas on each of arms 5,6 and with a mesh vest 36 adjacent loops 7,8 so as to provide additional support for the child and to reduce the chances of side slipping out of the shoulder straps. FIG. 6 shows another embodiment, similar to FIG. 3, but which provides a pair of shoulder straps 37,38 secured to arms 5,6 both adjacent loops 7,8 and remote therefrom through which the child slips its arms so as to reduce the possibility of side slipping out of the shoulder belt 4. FIGS. 7, 8 and 9 illustrate a modified version of the mesh vest 36 in which the vest is extended so as to substantially cover the chest of the child 1, as seen in FIG. 7. In the embodiment of FIG. 8, there is provided a single, generally female, snap fitting 39 to receive a male snap fitting 25 at the end of padded strap 24, as in the embodiment of FIG. 1. In the embodiment of FIG. 9, a pair of female snap fittings 40, 41 are provided to receive male fittings 32, 33 as seen in FIG. 5. Optionally, the vest 36 may be provided with a coloured design so as to provide a visually pleasing effect to the child wearer.

As will be appreciated by those in the art, where reference has been trade to male and female snap fittings, this is a matter of design choice and in all cases the male and female fittings may be reversed provided only that the mating ends are always complementary to each other. Similarly, while reference has been made to woven, flexible nylon webbing belts or to leather belts, any conventional seat belt material may be employed

I claim:

1. A child safety restraint system for use in a vehicle provided with a seat having a back portion and a seat portion, comprising:

a first Y-shaped elongated flexible belt member having a single first end and a bifurcated second end; said first end being provided with a first portion of a releasable snap fastening, and each part of said second end terminating in a closed loop; said first end of said first Y-shaped belt being adapted to pass over said back portion of said seat and depend downwardly therefrom;

a second Y-shaped flexible belt member having a single first end and a bifurcated second end; said first end being adapted to pass between said back portion and said seat portion of said seat and provided with a complementary second portion of said snap fastening adapted to releasably engage with said first portion on said first Y-shaped belt; said bifurcated end terminating in a pair of first portions of a releasable snap fastening; and a flexible elongated lap belt member adapted to pass through said closed loops in said first Y-shaped belt and provided with complementary second portions of a releasable snap fastening at each end thereof adapted to releasably engage with respective ones of said pair of first portions of snap fastenings on said second Y-shaped belt member.

2. A child safety restraint system as claimed in claim 1, including an elongated flexible crotch strap member having, at one end thereof a second portion of a snap fastening adapted to releasably engage a further first portion of a snap fastening on said second Y-shaped flexible belt; and having at least one first portion of a snap fastening at a second end thereof each adapted to releasably engage with a second respective portion of a snap fastening secured to said first Y-shaped belt member adjacent said loops at the second end thereof.

3. A child safety restraint system as claimed in claim 2, wherein said crotch strap member is a Y-shaped member having said first portions of said snap fastenings at a bifurcated end thereof and each adapted to releasably engage a respective one of a pair of second portions of snap fastenings secured to said first Y-shaped belt member adjacent said loops at the second end thereof.

4. A child safety restraint system as claimed in claim 2 including a pair of shoulder straps securely fastened at each end thereof to said first Y-shaped belt member in substantially planar parallel relationship thereto.

5. A child safety restraint system as claimed in claim 2, including a planar vest member securely fastened to said first Y-shaped belt member adjacent said loops therein.

6. A child safety restraint system as claimed in claim 5 wherein said vest member is provided with decorative indicia.

* * * * *